United States Patent
Clemen et al.

(10) Patent No.: US 8,683,811 B2
(45) Date of Patent: Apr. 1, 2014

(54) JET ENGINE WITH COMPRESSOR AIR CIRCULATION AND METHOD FOR OPERATING THE JET ENGINE

(75) Inventors: Carsten Clemen, Mittenwalde (DE); Enrique Sielaff, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 446 days.

(21) Appl. No.: 12/155,414

(22) Filed: Jun. 4, 2008

(65) Prior Publication Data

US 2009/0044543 A1 Feb. 19, 2009

(30) Foreign Application Priority Data

Jun. 5, 2007 (DE) .......................... 10 2007 026 455

(51) Int. Cl.
*F02C 6/08* (2006.01)
*F02K 3/00* (2006.01)
*F02C 1/00* (2006.01)

(52) U.S. Cl.
USPC ................... 60/782; 60/204; 60/266; 60/728; 60/785

(58) Field of Classification Search
USPC ........... 60/204, 262, 266, 728, 782, 785, 806, 60/39.093; 244/134 R
See application file for complete search history.

(56) References Cited

U.S. PATENT DOCUMENTS

| | | | |
|---|---|---|---|
| 2,870,957 A | 1/1959 | Stalker | |
| 2,933,238 A | 4/1960 | Stalker | |
| 4,083,181 A * | 4/1978 | Adamson | ..................... 60/39.52 |
| 4,255,083 A | 3/1981 | Andre et al. | |
| 4,419,045 A | 12/1983 | Andre et al. | |
| 5,468,123 A | 11/1995 | Guimier | |
| 5,581,996 A * | 12/1996 | Koch et al. | ....................... 60/782 |
| 5,607,284 A * | 3/1997 | Byrne et al. | .................. 415/58.5 |
| 5,611,197 A * | 3/1997 | Bunker | ........................... 60/806 |
| 5,732,547 A | 3/1998 | Olsen et al. | |
| 6,125,626 A | 10/2000 | El-Aini et al. | |
| 6,220,012 B1 | 4/2001 | Hauser | |
| 7,077,623 B2 | 7/2006 | Guemmer | |
| 7,263,834 B2 * | 9/2007 | Reiter et al. | ..................... 60/782 |
| 7,600,382 B2 * | 10/2009 | Ralls, Jr. | ......................... 60/730 |
| 2005/0226717 A1 * | 10/2005 | Xu | ............................... 415/58.5 |
| 2006/0104805 A1 | 5/2006 | Gummer | |
| 2006/0153673 A1 | 7/2006 | Guemmer | |

FOREIGN PATENT DOCUMENTS

| | | |
|---|---|---|
| DE | 694 06 071 T2 | 3/1998 |
| DE | 102 33 032 A1 | 1/2004 |
| DE | 698 25 825 T2 | 9/2005 |
| DE | 10 2004 030 597 A1 | 1/2006 |
| DE | 10 2004 055 439 A1 | 5/2006 |
| FR | 2370170 | 6/1978 |
| GB | 619722 | 3/1949 |
| WO | WO 2007/051444 A2 | 5/2007 |

OTHER PUBLICATIONS

European Search Report dated Jun. 14, 2011 for counterpart European patent application.

* cited by examiner

*Primary Examiner* — William H Rodriguez
*Assistant Examiner* — Arun Goyal
(74) *Attorney, Agent, or Firm* — Timothy J. Klima; Shuttleworth & Ingersoll, PLC

(57) ABSTRACT

In a jet engine with compressor air circulation provided for stabilizing the flow conditions, the compressed hot compressor air tapped from the flow path of the compressor (1) is first cooled in the bypass duct (3) and then resupplied to the upstream compressor via line (12). This reduces the thermal load of the blades and improves efficiency.

1 Claim, 1 Drawing Sheet

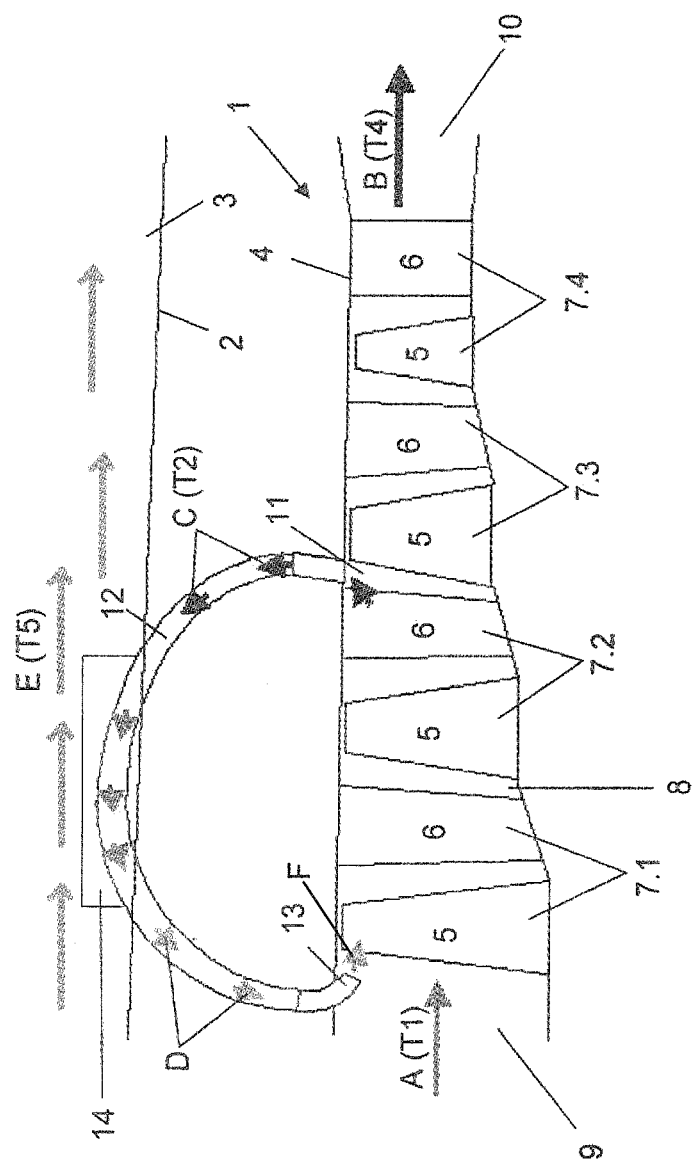

JET ENGINE WITH COMPRESSOR AIR CIRCULATION AND METHOD FOR OPERATING THE JET ENGINE

This application claims priority to German Patent Application DE102007026455.2 filed Jun. 5, 2007, the entirety of which is incorporated by reference herein.

This invention relates to a jet engine with compressor air circulation, featuring a compressor enclosed by the inner casing of a bypass duct, with the compressor being provided with a bleed point for removing compressor air at a downstream position of the flow path and at least one bleed air line originating at this bleed point and issuing into the compressor at an upstream compressor stage, and to a method for operating a jet engine with compressor air circulation.

The aerodynamic roadability of the components of the high-pressure compressor of a jet engine is limited by the growth and the separation of boundary layers on the blade surfaces as well as on the hub and on the casing. If stall occurs, i.e. in the unstable operating range of the compressor beyond the surge limit with correspondingly increased blade loading, the blades encounter uncontrolled vibration and may be damaged or destroyed. A larger number of compressor stages and blades, while enhancing loadability, decreases efficiency and significantly increases weight and cost. To provide aerodynamically optimum and stable flow conditions and thus to avoid the so-called compressor surge, at which stall occurs and the compressor is unable to deliver the air against the high pressure, with flow reversal being thereby produced in the compressor, it is already known from Specification DE 102 33 032 A1 to supply additional high-pressure air to the highly loaded, surge-prone rotor stage, with this air being drawn off at a downstream position of the flow path and re-supplied to the upstream compressor stage via at least one line. This concept is disadvantageous in that the compressed air tapped at the downstream position is hotter than the air at the supply point provided upstream. Thus, the compressor outlet temperature is continually increased and efficiency consequently reduced. Moreover, introduction of additional air with high temperature, i.e. compressor bleed air, may entail material problems, arising in particular from the high thermal loading of the blade tips and the temperature difference between the latter and the respective bottom blade portions with their distinctly lower temperature, with stresses resulting therefrom. In consequence, maintenance effort and cost investment will be accordingly high.

The present invention, in a broad aspect, provides for a jet engine with compressor air circulation of the type specified above and a corresponding method such that efficiency can be increased and maintenance effort and cost expense reduced.

In accordance with the basic idea of the present invention, the air bled under high pressure from the compressor is cooled down before it is resupplied to the compressor, thereby reducing the thermal load of the compressor blades subjected to the compressed bleed air. Moreover, continual further heating of the compressor air in the flow path of the compressor is avoided, thus enabling both stable flow conditions to be set and a higher compressor efficiency to be achieved.

Cooling of the compressor bleed air is accomplished by heat exchange with the cooler bypass air flowing in the bypass duct. For this, a bleed air line originating at the bleed point is routed, via a heat transferring element, through the bypass duct.

An embodiment of the present invention is more fully described in light of the accompanying drawing.

FIG. 1 schematically shows that part of a jet engine in which—enclosed by the bypass inner casing of the bypass duct—a multi-stage axial-flow compressor is provided.

The compressor 1 is enclosed by the inner casing 2 of the bypass duct 3 of a jet engine. Within a compressor casing 4 the compressor 1 comprises several compressor stages 7, each having a rotor blade row with rotor blades 5 and a stator vane row with stator vanes 6. A mass flow $m_{compressor}$ of hot compressor air (arrowhead A) with a temperature T1 of, for example, 400 K enters the compressor duct 8, which is externally confined by the compressor casing 4, at the inlet side 9 and leaves the compressor duct 8 at the outlet side 10 in the compressed state (arrowhead B) with a correspondingly increased outlet temperature T4 of, for example, 850 K. A bleed point (air tapping point) 11 is provided on the compressor duct 8 downstream of the second compressor stage 7.2 and connected to a bleed air line 12 by means of which compressed hot compressor bleed air (arrowhead C) with a temperature T2 of, for example, 500 K is returned to the inlet side 9 of the compressor 1 by virtue of the pressure differential and blown via a nozzle 13 onto the tips of the rotor blades 5 of the first compressor stage 7.1 (arrowhead D) to counteract stalls and the corresponding instabilities in compressor operation. However, the hot compressor bleed-air (arrowhead C) is not directly routed to the first compressor stage 7.1, but is fed through the bypass duct 3 and cooled by heat exchange with the cold bypass air (arrowhead E) in a heat transferring element 14 disposed in the bypass duct, as a result of which cooled, rather than hot, compressor bleed air (arrowhead F) whose temperature, in the present embodiment, is significantly below 500 K is supplied via the nozzle 13 to the tips of the rotor blades 5 of the first compressor stage 7.1.

Supplying cooled compressor bleed air (arrowhead F) in the event of flow instabilities reduces, on the one hand, the thermal loading of the rotor tips, thereby avoiding material damage, and lowers, on the other hand, the compressor outlet temperature T4 so that the efficiency of the compressor is—at least—not impaired in comparison with operation without injection of additional air. This enables the rotor blade tips to be subjected to higher loads, for example by reducing the number of blades, thereby enabling cost and weight to be saved.

For recirculation injection of compressor bleed air without cooling, a compressor efficiency of $\eta=0.93$ was determined in a reference calculation, assuming T1=400 K for the inlet temperature of the hot compressor air, T2=500 K for the temperature of the compressor bleed air during blow-in and T4=850 K for the exit temperature of the hot compressor air, and based on a pressure ratio $\pi=12.5$ and a bleed air quantity $m_{bleed\ air}$ of 1 percent.

In contrast, efficiency increases to $\eta=0.94$ if, on the basis of the aforementioned conditions, the compressor bleed air is cooled by heat exchange with the bypass air, which has a temperature T5=350 K, for example, with an efficiency of the heat exchanger of $\eta_{heat\ exchange}=0.6$ under adverse conditions. On the basis of the exemplary conditions here applied, this efficiency corresponds to the efficiency obtainable without necessary injection of compressor bleed air.

List of reference numerals

| | |
|---|---|
| 1 | Compressor |
| 2 | Inner casing of 3 |
| 3 | Bypass duct |
| 4 | Compressor casing |

-continued

| List of reference numerals | |
|---|---|
| 5 | Rotor blades |
| 6 | Stator vanes |
| 7 (7.1-7.4) | Compressor stages |
| 8 | Compressor duct, flow path |
| 9 | Inlet side of 8 |
| 10 | Outlet side of 8 |
| 11 | Bleed point, compressor air tapping point |
| 12 | Bleed air line |
| 13 | Nozzle |
| 14 | Heat Transferring Element |
| T1 | Compressor air inlet temperature |
| T2 | Compressor air temperature at bleed point |
| T4 | Compressor air temperature at outlet side |
| T5 | Bypass air temperature |
| Arrowhead A | Compressor air, inlet side |
| Arrowhead B | Compressor air, outlet side |
| Arrowhead C | Hot compressor bleed air |
| Arrowhead D | Cooled compressor bleed air |
| Arrowhead E | Cold bypass air |

What is claimed is:

1. A method for operating an aero jet engine with compressor air circulation for stabilizing flow conditions, comprising:

identifying a highly loaded, surge-prone compressor stage of the jet engine;

tapping a compressor bleed air at a bleed point at a compressor stage downstream of the surge-prone compressor stage and routing the tapped compressor bleed air through a heat exchanger to cool the tapped compressor bleed air, the tapped compressor bleed air having a higher pressure than a pressure at the surge-prone compressor stage;

reducing surge at the surge-prone compressor stage with the higher pressure bleed air by feeding the tapped higher pressure compressor bleed air through a bleed air line to the surge-prone upstream compressor stage;

providing the jet engine with a bypass duct for flowing bypass air that is cooler than the tapped compressor bleed air;

positioning the heat exchanger in the bypass duct to be in contact with the cooler bypass air to cool the tapped compressor bleed air prior to the tapped compressor bleed air reentering the compressor through the bleed air line such that a temperature of the cooled compressor bleed air reentering the compressor is lower than a temperature of compressor air at a position of reentering;

wherein the compressor air flows in an axial direction from the surge prone compressor stage to the bleed point compressor stage and wherein the heat exchanger is positioned axially between the two stages;

feeding the cooled compressor bleed air from the bleed air line at a feed position onto tips of rotor blades of the surge-prone compressor stage to simultaneously cool the tips of the rotor blades while reducing the surge at the surge-prone compressor stage; the upstream compressor stage being a separate compressor stage than the downstream compressor stage with the bleed point being separated from the feed position by at least one stator row; the routing of the bleed air from the bleed point through the bypass duct to the feed position bypassing and separate from a turbine stage of the engine.

* * * * *